United States Patent [19]

Taga et al.

[11] Patent Number: 4,504,109
[45] Date of Patent: Mar. 12, 1985

[54] INFRARED SHIELDING LAMINATION

[75] Inventors: Yasunori Taga; Yutaka Sawada, both of Aichi, Japan

[73] Assignee: Kabushiki Kaisha Toyota Chuo Kenkyusho, Aichi, Japan

[21] Appl. No.: 442,972

[22] Filed: Nov. 19, 1982

[30] Foreign Application Priority Data

Nov. 25, 1981 [JP] Japan .............................. 56-188950

[51] Int. Cl.³ ........................... G02B 5/22; G02B 5/28
[52] U.S. Cl. ........................................ 350/1.6; 350/166
[58] Field of Search ................... 350/1.1, 1.6, 1.7, 164, 350/166

[56] References Cited

U.S. PATENT DOCUMENTS 3,149,989  9/1964  Johnson ............................. 350/164

*Primary Examiner*—Bruce Y. Arnold
*Attorney, Agent, or Firm*—Koda and Androlia

[57] ABSTRACT

An infrared shielding lamination comprises alternate infrared shield layers and interferential reflection layers. These layers have good transparency to visible light and the infrared shield layers are able to prevent the transmission of the infrared rays. The interferential reflection layers along with adjacent infrared shield layers cause an interferential reflection effect on the wavelengths in the near-infrared spectrum, thus preventing the transmission of near-infrared rays. When a composite lamination according to this invention is applied to a glass plate or other plate transparent to visible light, the so-treated plate will exclude infrared and near-infrared rays without impairing the transparency of the plate to visible light.

14 Claims, 4 Drawing Figures

INFRARED SHIELDING LAMINATION

BACKGROUND OF THE INVENTION

This invention relates to an infrared shielding lamination, and more particularly to an infrared shielding laminated body which is transparent to visible light, but is capable of effectively shutting out infrared rays and near-infrared rays.

If use is made of window glass which is transparent to visible light but effectively excludes infrared rays, thermal insulation provided by the car windows will be accordingly improved. Specifically, the infrared rays will be prevented from reaching the interior of the car, whereby the cooling performance of the car will be improved accordingly. As a result, the amount of power required for air conditioning the car will be reduced.

Conventionally, window glass has been made transparent to visible light but capable of eliminating infrared rays by coating the glass with an infrared ray shielding substance. Such window glass, however, is unsatisfactory in its transparency to visible light, its ability to exclude infrared rays, the durability of its physical and chemical qualities and other characteristics.

In the prior art an ordinary glass plate which is transparent to visible light is covered by a single coating layer of infrared shielding substance, such as Indium-Tin-Oxide ($In_2O_3$—$SnO_2$) (hereinafter abbreviated as "ITO"). A family of semiconductor substances represented by ITO show fairly good shielding capability for the wavelengths in the infrared range longer than 13000 angstroms, which range is slightly separated from the spectrum of visible light, and these substances can be readily produced. These semiconductor substances, however, show inadequate shielding capability for the near-infrared range from 7000 to 13000 angstroms. Sunlight and other ambient light have a distribution of relatively strong energy over the whole range of the near-infrared spectrum, and therefore disadvantageously conventional infrared-shielding window glass allows the passage of a relatively large amount of thermal energy into an enclosed space, such as the interior of a car.

Up to now, attempts have been made to improve the optical characteristics of the ITO coating by extending its cut-off wavelength up to the near-infrared spectrum range. However, it has not been possible to produce such optically improved ITO without difficulty. What is worse is that the semiconductor material produced in this way shows poor transparency to visible light. For these and other reasons, it has been very difficult to obtain a coating material satisfactorily meeting the requirements both for transparency to visible rays and for shielding of infrared and near-infrared rays. The infrared shielding relying on a single ITO coating layer applied to a glass plate necessitates a large coating thickness, for instance, up to 3000–10000 angstroms. A large coating thickness, however, disadvantageously suffers a drastic decrease in its mechanical strength and the thick-coated layer is thus easy to break or peel off. This is because absorption of infrared rays in the thickness of the coating layer causes a thermal stress therein. When a glass with a thick infrared shield coating applied thereto is used as a window glass in a car, a mechanical stress is most liable to appear in the thickness of the infrared shield coating during the processing thereof or later during use. The rate of increase in these thermal and mechanical stresses rises with increasing thickness of the coating and accordingly the mechanical strength of the coating decreases inversely with the thickness of the coating.

OBJECT AND SUMMARY OF THE INVENTION

The object of the present invention is to provide a multilayered infrared shield which has good transparency to visible light and the ability to exclude all infrared rays in the spectrum of sunlight, particularly the short-wavelength rays of high energy in the near-infrared spectrum.

To attain this object of this invention a multi-layered infrared shield according to the present invention comprises at least two superposed layers of different optical characteristics, one layer being able to cause absorption and reflection of infrared rays and the other layer along with the said one layer being able to cause reflection due to interference of near-infrared rays, thereby diminishing the same. Hereinafter, reflection due to interference will be called interferential reflection.

More specifically, a multilayered infrared shield according to this invention comprises a visible light transparent substrate and an overlying composite lamination consisting of infrared shield layers and interferential reflection layers alternately lying on each other, said infrared shield layers each having a thickness of about $\lambda/4N_A$ (where "$\lambda$" stands for the wavelength at the center of the near-infrared spectrum and "$N_A$" stands for the refractive index of the shield layer at the center wavelength "$\lambda$") and permitting the transmission of the visible light but absorbing and reflecting the long-wavelength infrared rays thereby preventing the transmission of the infrared rays, and said interferential reflection layer having a thickness of about $\lambda/4N_B$ (where "$N_B$" stands for the refractive index of the interferential reflection layer at the center wavelength "$\lambda$" of the near-infrared spectrum) and permitting the transmission of the visible light but cooperating with said infrared shield layers in interferentive and reflection of near-infrared rays, thereby preventing the transmission of near-infrared rays.

DESCRIPTION OF THE PREFERRED EMBODIMENTS

Figure 1:
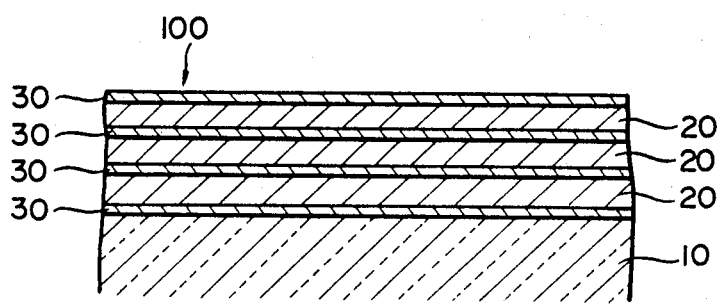
FIG. 1 shows, a diagrammatically in section, a fragment of an infrared shield lamination according to a preferred embodiment of this invention.

FIG. 1 shows, diagrammatically in section, a fragment of an infrared shield lamination according to one preferred embodiment of this invention. This infrared shield lamination is hereinafter described as being applied to a car window glass.

On a visible light-transparent substrate 10 are alternately overlaid infrared shield layers 20 and interferential reflection layers 30. This arrangement effectively prevents the passage of wavelengths of the infrared and near-infrared spectrum of sunlight 100. Specifically each infrared shield layer 20 is able to absorb and reflect the infrared rays of the sunlight 100, thereby preventing the intrusion of the infrared rays into the interior of the car, and each infrared shield 20 and adjacent interferential reflection layers 30 cooperate with each other in interferential reflection of wavelengths of the near-infrared rays of the sunlight 100.

In order to cause the effect of interferential reflection of the near-infrared rays of the sunlight, each infrared shield layer has a thickness of $\lambda/4N_A$ where "$\lambda$" stands for the wavelength at the center of the near-infrared spectrum (hereinafter referred to as "center wavelength") and "$N_A$" stands for the refractive index for the wavelength $\lambda$, and the interferential reflection layer has a thickness of $\lambda/4N_B$ where "$N_B$" stands for the refractive index for the center wavelength. The center wavelength is determined as the center in the wavelength range extending from 7000 to 13000 angstroms, and preferably from 8000 to 9500 angstroms.

The infrared and interferential reflection layers 20 and 30 are formed by vacuum evaporation, sputtering, ion-plating or other physical method appropriate for the purpose and/or by the immersion liquid method, spray thermal dissolution method or other chemical method appropriate for the purpose.

An ITO layer such as that described earlier regarding the conventional single-layer infrared shield is advantageously used as the infrared shield layer 20. This substance has transparency to visible light and, in view of the fact that interferential reflection is carried out, it is preferable to employ ITO which also has transparency to near-infrared rays since ITO of this type is easier to produce than that which has had its cut-off characteristics extended up to the near-infrared spectrum.

As regards the material of an interferential reflection layer, it has a refractive index which is different from that of the associated infrared layers 20, and at the same time, a substantial transparency to visible light. $TiO_2$ and $SiO_2$ meet these requirements.

The lamination of alternate layers of different optical characteristics according to this invention has a total thickness approximately equal to or even thinner than the thickness of the conventional single-layered ITO shield.

These two kinds of layers have good transparency to visible light even though a fraction of the visible light is absorbed by ITO and $TiO_2(SiO_2)$.

An infrared shield layer of ITO shows good absorption and reflection of infrared rays of wavelengths exceeding 13000 angstroms, thereby effectively rejecting the same. The alternate lamination of optically different layers according to this invention causes a good interferential reflection effect on near-infrared rays, the wavelengths of which range from 7000 to 13000 angstroms as mentioned earlier. The alternate layers of ITO and $TiO_2(SiO_2)$ have good transparency to near-infrared rays but these alternate layers have different thicknesses and refractive indices so that they cooperate with each other in such a way that a part of the near-infrared rays are reflected back from the boundaries of adjacent different mediums, whereas the remaining part of the sub-infrared rays undergo interference when passing through the lamination, thus substantially preventing the near-infrared rays from reaching the undermost substrate 10.

The infrared shield layers and interferential reflection layers cooperate with each other in reflection and interference (and hence exclusion) of the near-infrared rays, which otherwise would pass through the lamination as is the case with a conventional, single-layered ITO infrared shield. Thus, the adequate exclusion of the near-infrared rays can be accomplished without lowering the transparency of the lamination to visible light.

It is true that the infrared shield layer has lower transparency to visible light than the interferential reflection layer, but the composite lamination is made to be only as thick as or even thinner than a conventional single-layered ITO infrared shield. Therefore, the composite lamination has better transparency to visible light than a conventional one.

Generally, a transparent lamination will cause colors to appear as a result of optical interference, and these colors will appear in the car window glass. The composite lamination according to this invention advantageously uses an optical principle to positively suppress these interference colors as explained below.

From the point of safe driving and for the purpose of presenting a pleasing appearance, it is not preferable to strongly reflect visible light or to produce unpleasant colors in the car window glass as, for example, pink colors from the reflected or transmitted rays. With a composite lamination of transparent layers of different refractive indices selected to cause 7000-13000 angstrom rays to undergo reflection and interference, however, there was found a problem that other spectral rays would undergo undesired reflection and interference, thereby producing unpleasant interference colors, which would vary with the relative position of the eyes, light source and the intervening composite lamination.

The present invention takes full advantage of the dependence of the refractive index of ITO on wavelength and advantage of the low absorption of visible light by the substance so as to substantially diminish the appearance of interference colors.

Specifically, an infrared shield layer of ITO has a refractive index of about 2.0 in the range of visible light. The refractive index of the infrared shield layer of ITO decreases with increasing wavelength from, for instance, 6500 angstroms, or from the vicinity of the extremity of the visible spectrum. The refractive index is as small as 1.8 to 1.6 at the center wavelength "$\lambda$" of the near-infrared spectrum. On the other hand the refractive index of the interferential reflection layer of $TiO_2$ or $SiO_2$ shows little or no tendency of decreasing in the range of such longer wavelengths. It should be noted that the wavelength at which the refractive index of an infrared shield layer begins to decrease, and the degree of decrease can be controlled by controlling the amount of $SnO_2$ in the ITO and other factors for forming the ITO layers.

In a composite lamination of ITO and $TiO_2$ layers according to this invention light with the center wavelengths "$\lambda$" undergoes substantial interference and reflection because of a substantial difference between the refractive index of the infrared shield layer and that of the interferential reflection layer whereby transmission of near-infrared rays is prevented. On the other hand, the visible light undergoes little interference and reflection because of a negligibly small difference between the refractive indices of the two different layers, thus producing little interference color.

As seen from the above, according to this invention use is made of the dependence of the refractive index of ITO layer on wavelength to reduce visible interference color. Advantageously the standard of allowance for film thickness is less strict than ordinarily, thanks to the effect of reducing interference color. Computer analysis and experiments revealed that in a five-layered ($TiO_2$—ITO) structure only a negligible amount of visible interference color appeared even when each of the ITO layers had a thickness 20% less than the proper value ($\lambda/4N$) or when one of the three $TiO_2$ layers had a thickness 30% less than the proper value.

In fact, a combination of infrared shield layers (ITO) and interferential reflection layers ($In_2O_3$ without added $ZrO_2$ or Sn) both having the same refractive index in the range of visible light shows the most effective reduction of visible interference color.

Dependence of the refractive index on wavelength and absorption of a small proportion of the visible light by the composite lamination are used, in combination, in reduction of visible interference color. The magnetron sputtering method is used to form the ITO and $TiO_2$ layers, and the so-formed layers have a tendency to absorb a small proportion of the visible light. An even absorption is observed over the whole range of the visible light, and therefore the composite lamination produces a neutral grey, brown or blue tint. Of course, these colorings cause no unpleasant effect and no hindrance to car-driving. To the contrary, this slight absorption of the visible light is effective in reducing the coloring due to interference and reflection. Assuming that a person looks at a white object through the composite lamination, the slight absorption of the visible light will give the white object a softer appearance.

Advantageously, the composite lamination according to this invention has an increased mechanical strength due to lamination of a plurality of thin layers, compared with a single layer of the same thickness. This is obvious from the fact that the magnitude of stress increases greatly with the thickness of a layer. Also advantageously, if one of the layers which constitute a composite lamination should be broken, breakage will not progress to adjacent layers, so that the breakage is confined in the particular layer.

A $TiO_2$ layer, which is used as an interferential reflection layer, has increased mechanical and chemical stability, and therefore a $TiO_2$ layer applied to the uppermost of the composite lamination will protect the underlying composite lamination.

An $SiO_2$ layer, which is used as an interferential reflection layer, has very good durability and an affinity for water and other liquids, although it has a lower refractive index and somewhat poorer optical characteristics. Therefore, application of an $SiO_2$ layer to the uppermost of the composite lamination will improve the durability of the whole composite lamination. It has been observed that the use of a soda lime glass plate as a substrate tends to cause the invasion by alkali ions into an overlying ITO layer, thereby deteriorating its optical characteristics. The presence of a $TiO_2$ or $SiO_2$ layer 30 between the undergoing substrate 10 and an overlying ITO layer 20 prevents the contamination of the ITO layer with alkali ions (FIG. 1), and the intervening layer 30 permits the production of a composite lamination at an elevated temperature.

ITO, $TiO_2$, $SiO_2$ and similar oxides are capable of excluding ultraviolet rays, and therefore; the use of these oxides prevents ultraviolet rays from passing through a composite lamination, thus permitting the use of sulfides, halides and other substances which are readily deteriorated when exposed to ultraviolet rays.

Theoretical calculation and experiments reveal that a composite lamination having layers of larger refractive index (interferential reflection layers of $TiO_2$ 30 in FIG. 1) as the bottom and top layers makes fuller use of the interferential reflection effect. The order of laying two different kinds of layers on each other may be determined from the point of protective effect as mentioned early.

The effect of interferential reflection increases with the number of layers, but increasing the number of layers narrows the range of transmitted wavelength, and, at the same time, increases the absorption of visible light and the infrared shielding effect (above 13000 angstroms), and also increases the number of manufacturing processes. In view of these and other factors, a composite lamination preferably has three, five, seven or nine layers.

The embodiment mentioned above uses an ITO layer as the infrared shield having good rejection of infrared rays above 13000 angstroms, and good transparency both to visible light and the near-infrared rays from 7000 to 13000 angstroms. Such layers can be formed from $In_2O_3$ with or without added Sn, W, Mo, Ti or F; $SnO_2$ with or without added Sb, P, As or F; and $Cd_2SnO_4$.

An interferential reflection layer has substantial transparency both to visible light and near-infrared rays. $TiO_2$ is a material appropriate for forming an interferential reflection layer and it has a larger refraction index than that of ITO. Materials of a similarly larger refractive index are $ZrO_2$, $CeO_2$, ZnS, $SrTiO_3$, $Sb_2O_3$, SiO, $In_2O_3$ with or without added Sn, W, Mo, Ti or F, $SnO_2$ with or without added Sb, P, As or F, and $Cd_2SnO_4$.

$SiO_2$ has a lower refractive index than ITO, and other such materials of lower refractive index are $Al_2O_3$, $CaF_2$, $CeF_3$, $Na_3AlF_6$ and $MgF_2$.

An ITO layer has sufficient electrical conductivity to prevent window glass from being charged with electricity and from being made dusty with dielectric particles. Also, it can be used as a lead wire for a heater, antenna, electromagnetic wave shield, or burglar alarm.

The permissible deviation of the thickness of the infrared shield layer and the interferential reflection layer is from 75 to 130% of the exact value of $\lambda/4$. With this standard of the permissible range, the composite lamination has an average transmission rate of 70% or more for visible light, causing no appreciable amount of interference color to appear. The composite lamination has a transmission rate of 50% or less for the center wavelength $\lambda$ and an average transmission rate for the wavelength from 15000 to 20000 angstroms lower than the average transmission rate for visible light. Such composite lamination can be satisfactorily used as an infrared shield coating applied to a car window glass.

The refractive indices "N" of the two different kinds of layers for the center wavelength preferably meet the following requirements: The difference between the refractive indices of the two different layers is 0.3 or more, and preferably 0.5 or more. The larger refractive index is 1.5 or more, and preferably 2.0 or more.

As regards the ITO layers appropriate for use in a composite layer according to this invention, ITO layers of a total thickness equal to the thickness of a single ITO layer preferably have the following optical characteristics: good transparency to visible light and wavelengths ranging from 7000 to 13000 angstroms, preferably a transparency of 80% or more for the wavelengths ranging from 8000 to 10000 angstroms; relatively small transparency for wavelengths of 13000 or more angstroms, preferably an average transparency of 50% or less for wavelengths ranging from 13000 to 20000 angstroms and a transparency of 30% or less for the wavelength of 20000 angstroms.

Preferred examples of the present invention are given in the following:

EXAMPLE 1

A glass plate (Corning Product No. 7059) was used as a substrate. The glass plate was washed with isopropanol, and then the glass plate was subjected to spraying with Freon gas, thus evaporating the isopropanol from the glass substrate. The glass plate was coated with ITO (infrared shield layer) and $TiO_2$ (interferential reflection layer) by the sputtering method. Specifically the $TiO_2$ sputtering was carried out as follows: First, an enclosure containing the glass substrate was subjected to evacuation to the vacuum pressure of $1 \times 10^{-6}$ Torr; the substrate was heated to the temperature of 100° C.; and then the sputtering was performed in the atmosphere of pure argon at the pressure of $3 \times 10^{-3}$ Torr. RF magnetron sputter (14.56 MHz) was used with a $TiO_2$ target 76 milimeters in diameter. The deposition rate was about 50 angstroms per minute, and a one thousand angstroms thick $TiO_2$ layer was formed. The target was put 150 milimeters apart from the glass substrate. While being subjected to sputtering, the substrate was kept at the temperature of 100° C., and the substrate was rotated at the rate of twenty rotations per minute to assure evenness in the formation of the coating. Prior to the $TiO_2$ sputtering pre-sputtering was performed for above five minutes with the shutter closed. The resultant $TiO_2$ coating had a refraction index of about 2.4.

An ITO layer was formed on the $TiO_2$ layer as follows: The substrate was heated to the temperature of 370° C. in a vacuum atmosphere ($4 \times 10^{-6}$ Torr), and then DC magnetron sputtering was carried out to form an ITO layer to a thickness of about 1400 angstroms at the rate of 350 angstroms per minute in an argon atmosphere at the pressure of $3 \times 10^{-3}$ Torr. The ITO layer contained $SnO_2$ at about ten mol-percent. During sputtering, the substrate was rotated at the rate of twenty rotations per minute. Pre-sputtering was performed for five minutes. The resultant ITO layer had a refractive index of about 1.7 at the center wavelength $\lambda$.

Likewise, another $TiO_2$ coating was formed on the ITO layer. Thus, a three-layered composite lamination was obtained. The optical characteristics of the composite lamination are shown in FIG. 2.

Figure 2:
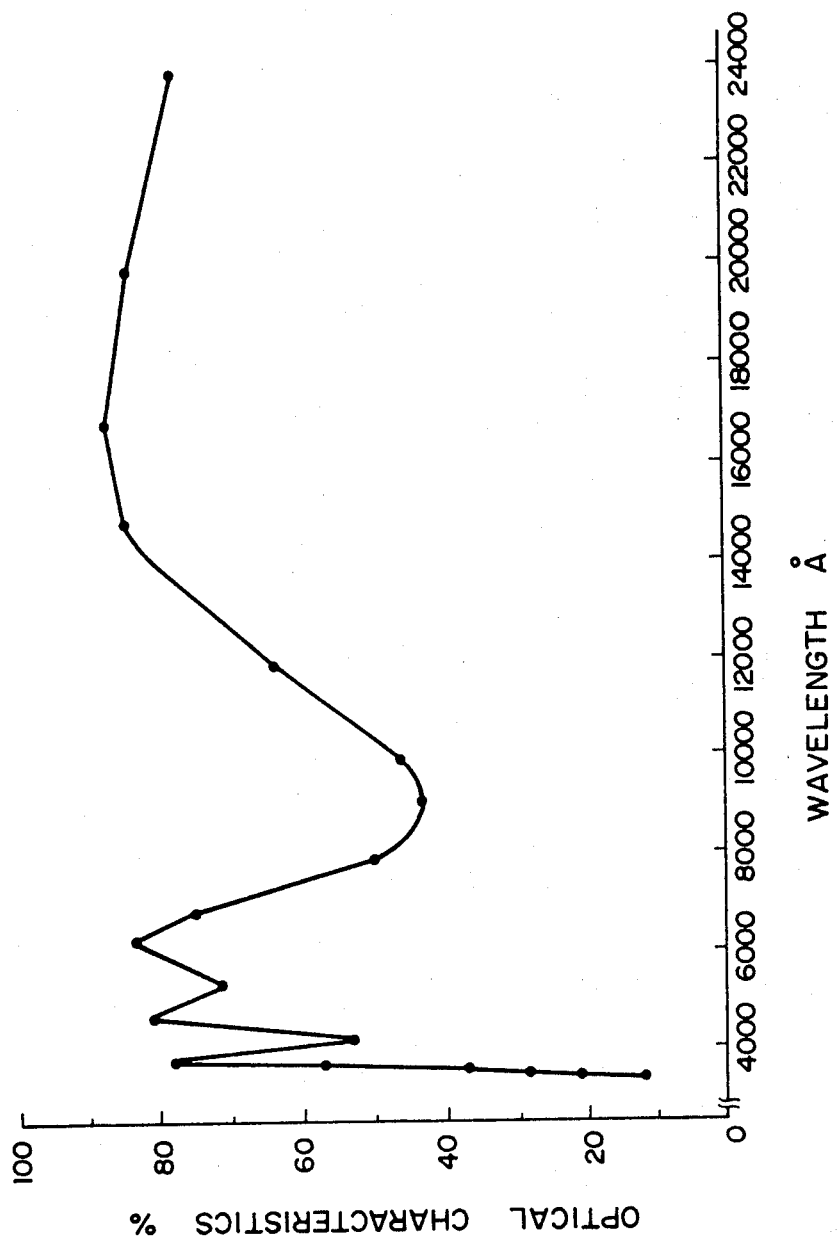
FIGS. 2, 3 and 4 show the spectral transmission characteristics of different examples of this invention.

The characteristic curve of FIG. 2 shows a sharp descent around the wavelength of 9500 angstroms, and this indicates the effect of shielding the near-infrared rays due to interferential reflection of the light of this wavelength in the composite lamination.

From the wavelength (9500 angstroms) at which the graph shows a sharp decrease and from the refractive indices of the two different kinds of layers ($N_A = 1.7$; $N_B = 2.4$) the thicknesses $t_A$ and $t_B$ of the layers were calculated:

$t_A = 9500/4 \times 1.7 \approx 1400$
$t_B = 9500/4 \times 2.4 \approx 990$

These figures are in good agreement with the measured thicknesses, 1400 ($t_A$) and 1000 ($t_B$).

EXAMPLE 2

The composite lamination of Example 1 had only one ITO layer which was 1000 angstroms thick. It had a relatively decreased rejection of the infrared rays (wavelengths of 1300 or more angstroms). In case a composite lamination is applied to a window glass, an increased number of ITO layers provides good shielding of the infrared rays.

A composite, seven-layered lamination according to this Example had a maximum transmission rate of 83% for visible light and an average transmission rate of 75%. Thus, the lamination had good transparency to visible light although the transmitted ray was tinted grey. Some amount of interference color appeared. However, little or no adverse effect on the eyes was caused.

Figure 3:
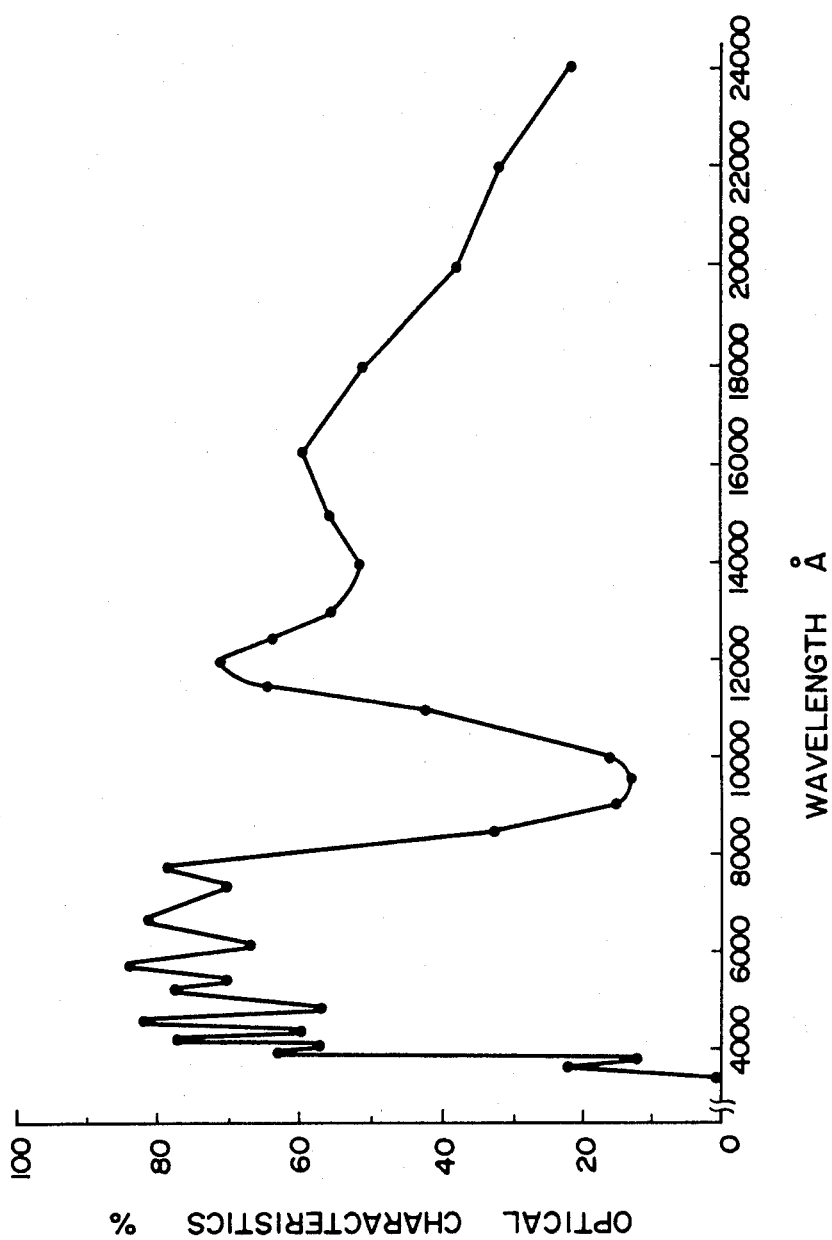

FIG. 3 shows the optical characteristics of the seven-layered lamination. When compared with FIG. 2 it is evident that the increase of layers does not shift the wavelength at which the interferential reflection phenomenon appears and that the increase of layers is effective to enhance the degree of reflection and narrow the range of wavelengths within which the enhanced reflection resulted. When the composite lamination of Example 2 was applied to a window glass, the window glass showed improved rejection of near-infrared rays due to the interferential reflection effect on those wavelengths.

The composite lamination of this Example has an increased total thickness of ITO layers, accordingly improving the shielding effect for infrared rays.

The increased number of layers reduce somewhat the transmission factor for visible light, but still have a maximum rate of 83% and an average rate of 70%. These figures are large enough to assure good transmission of visible light. In short, the increase of layers effectively improves the shielding effect for infrared rays although the transmission of visible light is somewhat decreased.

FIG. 3 shows the secondary decrease of the transmission rate around the wavelength of 13500 angstroms due to the structure of lamination, and this secondary effect contributes to the exclusion of infrared rays. Also, the graph shows secondary effects in the range of visible light, which are caused by the large number of weak reflections. These reduce somewhat the transmission rates, but advantageously contribute to the diffusion of reflected color.

In forming an increased number of layers, the underlying layers are repeatedly subjected to heating, thereby causing their physical characteristics to vary. For the purpose of assuring the same physical characteristics for each layer, the composite lamination is preferably subjected to a heat treatment at the final stage.

EXAMPLE 3

Figure 4:
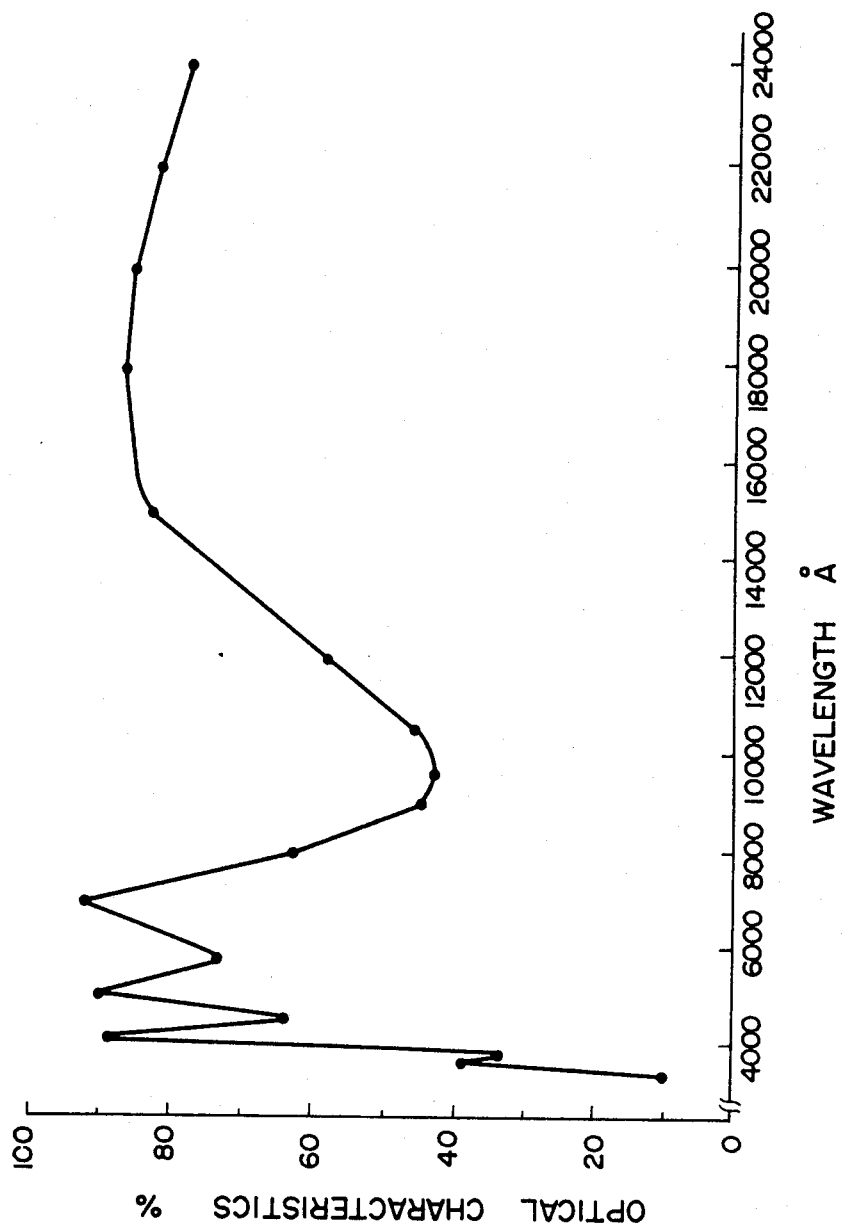

FIG. 4 shows a three-layered lamination similar to Example 1. It is different from Example 1 only in that the ITO layer is about 12000 angstroms thick whereas the ITO layer of Example 1 is about 14000 angstroms thick. The graph of FIG. 4 shows the shift away from the ideal wavelength of the wavelengths at which the interferential reflection phenomenon appears. In spite of this shift, this example is entirely satisfactory for practical purposes.

In the embodiments mentioned above, it is assumed that the incident light comes into the lamination along a line perpendicular to the boundary surface and it is on this assumption that the thickness of a layer is determined. If occasion demands, the thickness of the layer can be determined on the assumption that the incident light comes into the lamination obliquely.

As is apparent from the above, a composite lamination according to this invention has good transparency for visible light and, at the same time, a good rejection to infrared and near-infrared rays. When a composite lamination according to this invention is applied to a transparent plate such as a car window glass, the so-treated transparent plate will have the same optical characteristics as the composite lamination without injuring the transparency of the plate.

What is claimed is:

1. A multi-layer infrared shield comprising a visible light transparent substrate and an overlying composite lamination consisting of at least one infrared shield layer and at least one interferential reflection layer alternately lying on each other, said infrared shield layer having a thickness of about $\lambda/4N_A$ (where $\lambda$ stands for the wavelength at the center of the near-infrared spectrum and $N_A$ stands for the refractive index of the infrared shield layer at the wavelength $\lambda$) which permits the transmission of visible light while absorbing far-infrared rays, thereby preventing the transmission of far-infrared rays, and said interferential reflection layer having a thickness of about $\lambda/4N_B$ (where $N_B$ stands for the refractive index of the interferential reflection layer at said wavelength $\lambda$) which permits the transmission of visible light and, in cooperation with said infrared shield layer, reflects near-infrared rays, thereby preventing the transmission of near-infrared rays.

2. A multi-layer infrared shield according to claim 1 wherein the difference in refractive index between said infrared shield layer and said interferential reflection layer at the wavelength $\lambda$ is not less than 0.3 and the larger of the indices is not less than 1.5.

3. A multi-layer infrared shield according to claim 1 wherein said at least one infrared shield layer is formed of at least a member selected from the group consisting of: $In_2O_3$; $In_2O_3$ with one of Sn, $SnO_2$, W, Mo, Ti and F; $SnO_2$ with one of Sb, P, As and F; and $Cd_2SnO_4$.

4. A multi-layer infrared shield according to claim 3 wherein said interferential reflection layer is formed of at least one member selected from the group consisting of: $TiO_2$, $ZrO_2$, $CeO_2$, ZnS, $SrTiO_3$, $Sb_2O_3$, SiO, $In_2O_3$, each with or without one of Sn, $SnO_2$, W, Mo, Ti, or F; $SnO_2$; $SnO_2$ with one of Sb, P, As and F; and $Cd_2SnO_4$, said interferential reflection layer having a larger refractive index at the wavelength $\lambda$ at the center of the near-infrared spectrum than said infrared shield layer.

5. A mult-layer infrared shield according to claim 4 wherein said infrared shield layer is formed of indium-tin-oxide.

6. A multi-layer infrared shield according to claim 4 wherein said interferential reflection layer is formed of $TiO_2$.

7. A multi-layer infrared shield according to claim 6 wherein the number of said interferential reflection layers is one larger than that of said infrared shield layers.

8. A multi-layer infrared shield according to claim 3 wherein said interferential reflection layer is formed of at least one member selected from the group consisting of $SiO_2$, $Al_2O_3$, $CaF_2$, $CeF_3$, $Na_3AlF_6$ and $MgF_2$, said interferential reflection layer having a smaller refractive index at the wavelength $\lambda$ at the center of the near-infrared than said infrared shield layer.

9. A multi-layer infrared shield according to claim 8 wherein said infrared shield is formed of indium-tin-oxide.

10. A multi-layer infrared shield according to claim 8 wherein said interferential reflection layer is formed of $SiO_2$.

11. A multi-layer infrared shield according to claim 10 wherein the number of said interferential reflection layers is one larger than that of said infrared shield layers.

12. A multi-layer infrared shield according to claim 1, wherein the wavelength $\lambda$ is the range of 7000–13000 A, thereby shielding the infrared rays contained in sunlight.

13. A multi-layer infrared shield according to claim 1 wherein said substrate is formed of soda lime glass, said infrared shield layer is formed of ITO, and said interferential reflection layer is formed of $TiO_2$ and $SiO_2$, said interferential layer being provided between said substrate and said infrared shield layer, thereby preventing the invasion of alkali ions released by the soda lime glass into said infrared shield layer.

14. A multi-layer infrared shield according to claim 1 wherein said total number of said infrared shield layers and said interferential reflection layers is either 3, 5, 7 or 9, thereby obtaining a good transparency for visible light and good shielding for infrared rays of long wavelength.

* * * * *